US 8,768,250 B2

(12) United States Patent
Ma et al.

(10) Patent No.: US 8,768,250 B2
(45) Date of Patent: Jul. 1, 2014

(54) ENHANCED NEAR FIELD COMMUNICATION TERMINAL, SMART CARD AND COMMUNICATION METHOD THEREOF

(75) Inventors: Jingwang Ma, Shenzhen (CN); Qian Jia, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 99 days.

(21) Appl. No.: 13/258,470

(22) PCT Filed: Dec. 18, 2009

(86) PCT No.: PCT/CN2009/075726
§ 371 (c)(1),
(2), (4) Date: Oct. 13, 2011

(87) PCT Pub. No.: WO2010/118615
PCT Pub. Date: Oct. 21, 2010

(65) Prior Publication Data
US 2012/0021683 A1    Jan. 26, 2012

(30) Foreign Application Priority Data
Apr. 14, 2009  (CN) .......................... 2009 1 0132867

(51) Int. Cl.
*H04W 4/00*    (2009.01)
(52) U.S. Cl.
USPC ...................... 455/41.1; 455/41.2; 455/41.3
(58) Field of Classification Search
CPC .................................................... H04W 4/008
USPC ................ 455/41.1, 41.2, 41.3, 558
See application file for complete search history.

(56) References Cited

U.S. PATENT DOCUMENTS

| 7,375,616 | B2 | 5/2008 | Rowse et al. |
| 8,116,678 | B2 * | 2/2012 | Johnson et al. ............. 455/41.1 |
| 2006/0052055 | A1 | 3/2006 | Rowse et al. |
| 2006/0266843 | A1 | 11/2006 | Flattin et al. |

(Continued)

FOREIGN PATENT DOCUMENTS

| CN | 1625099 A | 6/2005 |
| CN | 101010887 A | 8/2007 |

(Continued)

OTHER PUBLICATIONS

International Search Report in international application No. PCT/CN2009/075726, mailed on Mar. 25, 2010.

(Continued)

*Primary Examiner* — Wen Huang
(74) *Attorney, Agent, or Firm* — Oppedahl Patent Law Firm LLC

(57) ABSTRACT

The present invention discloses a smart card communication method, a smart card, and an enhanced near field communication NFC terminal. The method is used for communication between the smart card and an NFC contactless front-end chip; when installing a contactless payment application, the smart card records a communication standard adopted by a contactless payment system corresponding to the contactless payment application, wherein the communication standard is identified by identification information provided by the contactless payment application; it further comprises: for each card application gate, the smart card judges whether a contactless payment application corresponding to the card application gate exists based on the identification information; if yes, creating a pipe between the card application gate and a corresponding card RF gate in the NFC contactless front-end chip.

11 Claims, 1 Drawing Sheet

(56) References Cited

U.S. PATENT DOCUMENTS

| | | | |
|---|---|---|---|
| 2007/0155430 A1* | 7/2007 | Cheon et al. | 455/558 |
| 2007/0293155 A1* | 12/2007 | Liao et al. | 455/41.2 |
| 2008/0306849 A1 | 12/2008 | Johnson, Jr. et al. | |
| 2009/0075592 A1* | 3/2009 | Nystrom et al. | 455/41.1 |
| 2009/0098825 A1 | 4/2009 | Huomo et al. | |
| 2010/0026454 A1 | 2/2010 | Rowse et al. | |
| 2010/0227553 A1* | 9/2010 | Charrat et al. | 455/41.1 |
| 2010/0248710 A1* | 9/2010 | Sklovsky et al. | 455/420 |
| 2012/0196529 A1* | 8/2012 | Huomo et al. | 455/41.1 |

FOREIGN PATENT DOCUMENTS

| | | |
|---|---|---|
| CN | 101147387 A | 3/2008 |
| CN | 101171604 A | 4/2008 |
| FR | 2904741 A1 | 2/2008 |
| JP | 2006227678 A | 8/2006 |
| JP | 2008259200 A1 | 10/2008 |
| JP | 2008269070 A | 11/2008 |
| WO | 2006095212 A1 | 9/2006 |
| WO | 2008017745 A1 | 2/2008 |

OTHER PUBLICATIONS

English Translation of the Written Opinion of the International Search Authority in international application No. PCT/CN2009/075726, mailed on Mar. 25, 2010.

Supplementary European Search Report in European application No. 09843249.5, mailed on Apr. 7, 2014. (10 pages—see entire document).

* cited by examiner

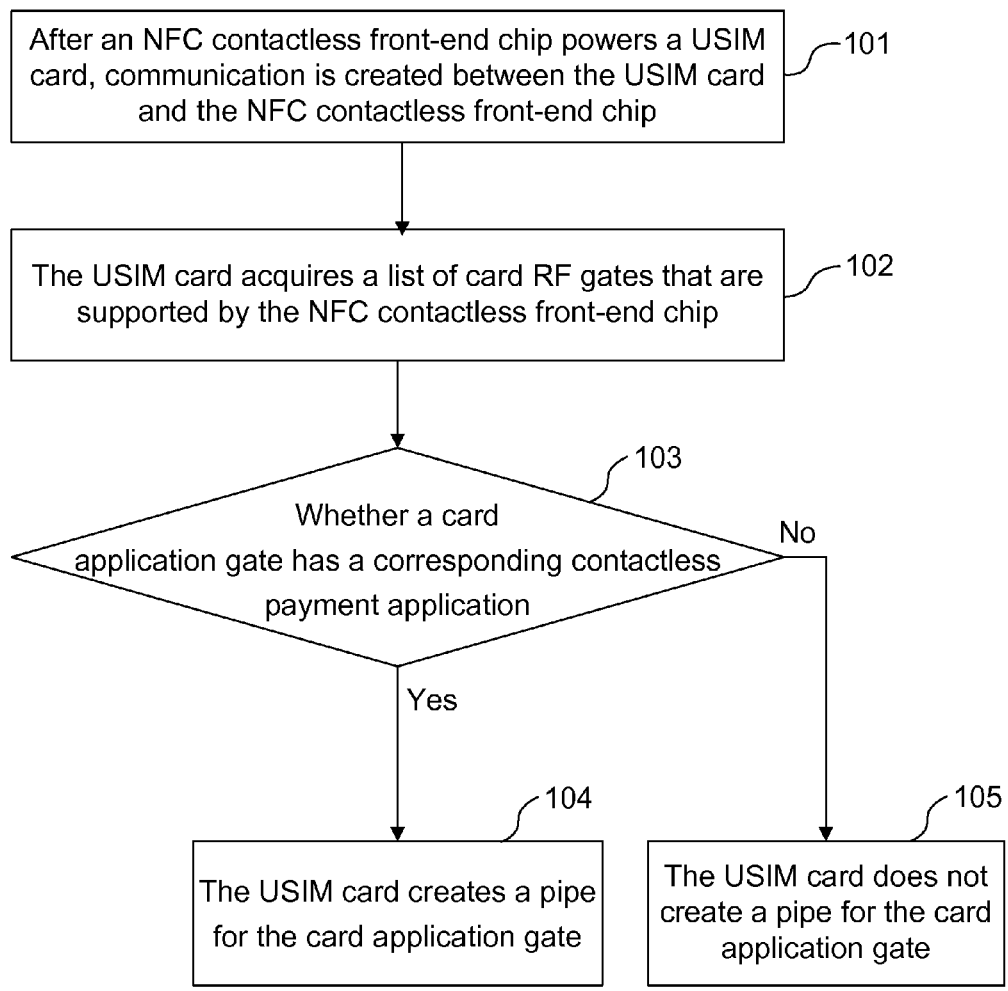

ENHANCED NEAR FIELD COMMUNICATION TERMINAL, SMART CARD AND COMMUNICATION METHOD THEREOF

TECHNICAL FIELD

The present invention relates to an enhanced Near Field Communication (eNFC) technology, particularly to an eNFC terminal, a smart card and a communication method thereof.

BACKGROUND

After over 10 years of development, an Integrated Circuit (IC) card, particularly a contactless IC card has been widely applied to the field of public transportation, access control, electronic micropayment and the like. Meanwhile, a mobile terminal has been substantially popularized among people and brought much convenience to the work and living of people after over 20 years of development; in addition, the mobile terminal is more and more powerful in functions and tends to integrate more functions. In combination with the contactless IC card technology, the mobile terminal is applied to the field of electronic payment, which will further expand its application range and bring more convenience to the living of people, therefore, it has a great application prospects.

After adding the function of supporting the contactless IC card to the mobile terminal, the mobile terminal can be simulated as the contactless IC card to interact with a contactless card reader in a payment system, and then a contactless payment application can be realized. Many kinds of technical solutions exist for realizing contactless payment through a mobile terminal; and the mainstream one used in the industry is eNFC, which has gained support from operators and related terminal companies.

The eNFC solution, as enhancement and improvement of a Near Field Communication (NFC) solution, is a short-distance radio communication technology working at 13.56 MHz and is evolved from merging a radio frequency identification technology and an interconnection technology.

To realize the eNFC solution on the mobile communication terminal, it is necessary to add an NFC Contactless Front-end (CLF) chip and an NFC antenna to the terminal and to use a smart card that supports a Single Wire Protocol (SWP), wherein the smart card may be a Subscriber Identity Module (SIM) card, a User Identity Model (UIM) card, a User Service Identity Module (USIM) card or other smart cards; wherein communication standards supported by the NFC contactless front-end chip include ISO 14443 Type A/Type B, Felica, Mifare, ISO15693 and the like. The NFC contactless front-end chip and NFC antenna in the mobile terminal realize a contactless communication function and can communicate with an external contactless card reader according to related communication standards.

In the eNFC solution, the NFC contactless front-end chip can communicate with a main processor chip of the terminal through a Universal Asynchronous Receiver/Transmitter (UART) interface, and the function of the NFC contactless front-end chip is controlled by the main processor of the mobile terminal. The NFC contactless front-end chip is connected with pin C6 of the smart card through a signal wire, and communicates with the smart card in a physical layer by using a Single Wire Protocol (SWP); and a communication process between the NFC contactless front-end chip and the smart card on applications such as contactless card simulation and card-reader simulation is finished by using a Host Control Interface (HCI) in a is logical layer. The smart card is connected with the main processor chip of the terminal via an ISO7816 interface, wherein the connection uses a reset pin, a CLOCK (CLK) pin and an Input-Output (IO) pin of the smart card, which correspond to pins C2, C3 and C7 of the smart card respectively.

The eNFC is characterized in that an application related to the electronic payment is stored in the smart card, and the smart card performs storage and execution of the electronic payment application. In addition, the collector voltage (VCC) of the smart card, i.e., pin C1, is connected with the NFC contactless front-end chip, so that the eNFC technology can support a power down mode of the terminal. In such mode, the NFC contactless front-end chip and the smart card obtain energy from an electromagnetic field generated by an external contactless card reader through the NFC antenna, so that they can work in the card simulation mode and interact with the external contactless card reader to implement the electronic payment even though the mobile terminal loses power.

When implementing the contactless payment, the mobile terminal can support multiple contactless payment applications at the same time. The smart card conforms to technical requirements in a global platform card specification V2.2. The smart card can support multiple applications. Payment applications from different application providers can be placed in different security domains of the smart card, and logical isolation is implemented between the security domains, so that storage and running of the applications are not interfered with one another to provide a safe application running environment.

In addition, a Java card has become a development trend of the smart card. Because the smart card adopts the specification of the Java card, applications running in the smart card can realize platform independence, and the payment applications developed according to technical specifications of the Java card can run in the Java cards of different smart card producers, thereby great technical advantages can be brought to the population of the payment applications. Therefore, in case that the mobile terminal supports the contactless payment, the smart card generally conforms to the technical specifications of the Java card; and a payment application program is written in a Java language and conforms to the technical specifications of the Java card.

For the applications in the smart card, each application has a unique Application Identifier (AID) including a Registered Application Provider Identifier (RID) and a Proprietary Application Identifier Extension (PIX) code; and the encoding rule of the AID conforms to the requirements of ISO/IEC 7816-5: identification cards—integrated circuit cards—Part 5: registration of application providers: 2004.

The payment application in the smart card may be preset in the smart card during issuing the smart card or be downloaded to the smart card from a remote server through the mobile terminal after issuing the smart card. When the application is installed on the smart card, relevant information about the application will be registered into a registry of the smart card, wherein the registered information may comprise an application name, the AID, and an application state, etc.

When the mobile terminal is simulated to be a contactless card for payment, the mobile terminal communicates with the contactless card reader in the contactless payment system by using a radio communication technology such as the RFID technology, and foreign countries may also adopt other short-distance communication technologies. At present, there is no common communication standard for the communication between the contactless card or the terminal as the contactless card in the existing contactless payment system and the card reader in the contactless payment system. Instead, the contactless payment system adopts a corresponding communication standard as required by itself, and the communication between the contactless card and the card reader is performed according to a radio frequency interface and a communication protocol specified in the adopted communication standard. The communication standards applied to the contactless payment are mainly the standards related to the RFID technology including ISO14443 Type A, ISO14443 Type B, Mifare, Felica, ISO15693 and the like. Some foreign countries adopt other short-distance communication technologies. For example: a public transportation card payment system generally adopts the ISO14443 Type A standard and Mifare standard; and a contactless bank card payment system generally adopts the ISO14443 Type B standard.

The objective of the mobile terminal for realizing the contactless payment by adopting the eNFC solution and NFC solution is to support multiple contactless payment applications and multiple communication standards, and to communicate with card readers in different contactless payment systems according to technical requirements of the corresponding communication standards. In order to enable the mobile terminal to support multiple communication standards, the NFC contactless front-end chip in the mobile terminal should support multiple communication standards, and the smart card should support multiple communication standards as well.

An electronic payment application program Applet based on a javacard.framework.Applet class base can implement install, register, select, deselect, and process defined in the runtime environment specification for the Java card platform, version 2.2.2 and also realize the technical requirements of the payment in the corresponding payment application specifications. During issuing an application program, it is necessary to first compile a source code file into a binary class file (.class file) by using a Java compiler, and then convert the class file by a converter and a checker; the converted file is an install file that can be installed to the smart card, i.e., a Converted Applet (CAP) file. After the install file of the payment application is downloaded to the smart card, the installation of the payment application can be executed; after the payment application is successfully installed and personalized, the installed payment application can be initiated to perform the corresponding payment service.

In the eNFC solution, the NFC contactless front-end chip and the smart card communicate with each other through an HCI interface in the logic layer to complete the communication when the mobile terminal is simulated as the contactless IC card. The HCI interface is specified in the 102 622 specification of the European Telecommunications Standards Institute (ETSI): smart cards-Universal Integrated Circuit Card (UICC)-Contactless Front-End (CLF) interface-Host Controller Interface (HCI). According to the requirements of the HCI interface, when the mobile terminal is simulated as the contactless card, the NFC contactless front-end chip acts as a host controller, and the smart card acts as a host; wherein the NFC contactless front-end chip processes the communication with the external contactless card reader and the smart card processes the contactless payment application.

The NFC contactless front-end chip can support at least one communication standard. For each supported communication standard, there is one corresponding contactless card RF gate in the NFC contactless front-end chip. The smart card can support at least one communication standard. For each supported communication standard, there is one corresponding contactless card application gate in the smart card. The card application gate in the smart card can create a pipe with the corresponding card RF gate in the NFC contactless front-end chip. Data of the corresponding communication standard are transmitted by the pipe. In case of supporting multiple communication standards simultaneously between the smart card and the NFC chip, each communication standard has one private pipe between the NFC contactless front-end chip and the smart card, and the smart card is responsible for creating and closing the pipe between the smart card and the NFC contactless front-end chip.

When the mobile terminal is in a contactless card contactless mode, after the NFC contactless front-end chip powers the smart card, the single wire protocol is adopted between the smart card and the NFC contactless front-end chip to create a communication between the physical layer and the data layer; the smart card obtains the card RF gate in the NFC contactless front-end chip; and then the pipe between the card application gate in the smart card and the corresponding card RF gate in the NFC contactless front-end chip is created. Only after the pipe between the card application gate in the smart card and the corresponding card RF gate in the NFC contactless front-end chip is created, the NFC contactless front-end chip will initiate relevant functions of the communication standards corresponding to the Card RF Gate in the NFC contactless front-end chip. After the mobile terminal enters into the working area of the contactless card reader which adopts the communication standards, the NFC contactless front-end chip will respond to relevant signals sent by the contactless card reader.

Under the current technical condition, the contactless payment application cannot identify the communication standard adopted by the contactless payment system corresponding to the contactless payment application; after the contactless payment application is installed to the smart card, the smart card also cannot know the communication standard corresponding to the installed contactless payment application in the card. Therefore, after the smart card is powered on, all the card application gates in the smart card will create pipes with the corresponding card RF gates in the NFC contactless front-end chip; after the pipe is created, the communication function of the NFC contactless front-end chip will be switched on and respond to the signals of its corresponding contactless card reader. However, such processing method causes a problem that even if there is no contactless payment application adopting a certain communication standard in the smart card, the smart card may still create a pipe corresponding to the communication standard with the NFC contactless front-end chip, thereby the relevant functions of the NFC contactless front-end chip corresponding to this communication standard are switched on; consequently, when entering into the working area of the contactless card reader that adopts the communication standard, the mobile terminal will respond to the signal sent by the contactless card reader and communicate with it, while the smart card has no contactless payment application corresponding to the communication standard, then it is unnecessary to communicate with the contactless card reader.

SUMMARY

In view of this, the technical problem to be solved by the present invention is to provide a smart card, an eNFC terminal supporting and using the smart card, and a method for communication between the smart card and an NFC contactless front-end chip.

The present invention provide a smart card communication method, for communication between a smart card and an NFC contactless front-end chip, it comprises: when installing a contactless payment application, the smart card records a communication standard adopted by a contactless payment system corresponding to the contactless payment application, wherein the communication standard may be identified by identification information provided by the contactless payment application; it further comprises:

for each card application gate, the smart card judges whether a contactless payment application corresponding to the card application gate exists based on the identification information; if yes, creating a pipe between the card application gate and a corresponding card RF gate in the NFC contactless front-end chip.

The method may further comprise: if no contactless payment application corresponding to the card application gate exists, no pipe is created between the card application gate and the corresponding card RF gate in the NFC contactless front-end chip.

In the above solution, the step of recording a communication standard adopted by a contactless payment system corresponding to the contactless payment application may comprise: recording information about the payment application in a registry of the smart card; and the information about the payment application may comprise identification information about the communication standard adopted by the contactless payment system corresponding to the contactless payment application.

In the above solution, the communication standard adopted by the contactless payment system may be a communication standard corresponding to a communication technology adopted by communications between a contactless card in the contactless payment system or a terminal equipment serving as a contactless card and a card reader in the contactless payment system.

In the above solution, the step of judging may comprise: the smart card queries in information about installed contactless payment application recorded in the smart card through the identification information, and judges whether a contactless payment application corresponding to the card application gate exists.

In the above solution, the step that the contactless payment application provides the identification information may comprise: a contactless payment application program provides the identification information about the communication standard adopted by the corresponding contactless payment system in a version number.

In the above solution, the contactless payment application corresponding to the card application gate may comprise one or more contactless payment applications installed in the smart card; and the communication standard adopted by the contactless payment system corresponding to the contactless payment application may be identical to the communication standard corresponding to the card application gate.

In the above solution, the program version number of the contactless payment application may have a format of: AP_'an identifier of communication standard'_'version number'; and the identifier of the communication standard may be represented by letters.

The present invention also provides a smart card, it comprises a recording unit, a judging unit and a pipe creating unit, wherein the recording unit is used for recording a communication standard adopted by a contactless payment system corresponding to a contactless payment application during installing the contactless payment application, and the communication standard is identified by identification information provided by the contactless payment application;

the judging unit is used for determining, for each card application gate in the smart card, whether a contactless payment application corresponding to the card application gate exists through the identification information, and notifying the pipe creating unit if it exists; and the pipe creating unit is used for creating a pipe between the card application gate and a corresponding card RF gate in an NFC contactless front-end chip based on notification from the judging unit.

The present invention also provides an eNFC terminal supporting a contactless payment application, it comprises an NFC contactless front-end chip with more than one card RF gate and a smart card with more than one card application gate, wherein the smart card comprises:

a recording unit, for recording a communication standard adopted by a contactless payment system corresponding to a contactless payment application during installing the contactless payment application, and the communication standard is identified by identification information provided in advance by the contactless payment application;

a judging unit, for determining, for each card application gate in the smart card, whether a contactless payment application corresponding to the card application gate exists through querying the identification information, and notifying a pipe creating unit if it exists; and a pipe creating unit, for creating a pipe between the card application gate and the corresponding card RF gate in the NFC contactless front-end chip based on notification from the judging unit.

By using the eNFC terminal, smart card and communication method thereof, it is possible to determine whether to create a pipe between the card application gate in the smart card and the card RF gate in the NFC contactless front-end chip based on whether the smart card has a contactless payment application corresponding to the card application gate, thereby reducing the unnecessary resource waste and simplifying the pipe creating flow.

BRIEF DESCRIPTION OF THE DRAWINGS

FIG. 1 shows a flowchart diagram for implementing a smart card communication according to the present invention.

DETAILED DESCRIPTION

The smart card provided by the present invention comprises a recording unit, a judging unit and a pipe creating unit, wherein the recording unit is used for recording a communication standard adopted by a contactless payment system corresponding to a contactless payment application during installing the contactless payment application; the communication standard is identified by identification information provided in advance in the contactless payment application;

the judging unit is used for determining, for each card application gate in the smart card, when creating a pipe between the smart card and an NFC contactless front-end chip, whether a contactless payment application corresponding to the card application gate exists through querying the identification information, and notifying the pipe creating unit if it exists; and the pipe creating unit is used for creating a pipe between the card application gate and a corresponding card RF gate in the NFC contactless front-end chip based on notification from the judging unit.

The present invention further provides an eNFC terminal, and it comprises an NFC contactless front-end chip with multiple card RF gates and a smart card with multiple card application gates, wherein the smart card has the recording unit, the judging unit and the pipe creating unit as described above.

The present invention further provides a method of communication between a smart card and an NFC contactless front-end chip, and it comprises:

first, providing identification information in a contactless payment application to identify a communication standard adopted by a contactless payment system corresponding to the payment application.

Specifically, the step may be implemented below: during issuing a contactless payment application program, converting a class file into an install file that can be installed on the smart card, such as a CAP file, by using a converter; adding the identification information about the communication standard corresponding to the contactless payment application into a version parameter of a conversion command, and identifying the communication standard adopted by the corresponding contactless payment system through the identification information in a version number of the contactless payment application program.

During installing the contactless payment application, when the smart card records information about the payment application, the communication standard adopted by the contactless payment system corresponding to the contactless payment application is recorded.

The information about the payment application which is recorded in a registry of the smart card comprises identification information about the communication standard which is adopted by the contactless payment system corresponding to the contactless payment application.

Subsequently, the following steps are executed inside the smart card:

when the smart card creates a pipe between a card application gate in itself and a card RF gate in an NFC contactless front-end chip, it first determines, for each card application gate in the smart card, whether a contactless payment application corresponding to the card application gate exists through querying a registry in the smart card, and the identification information about the communication standard corresponding to the installed contactless payment application has been recorded in the registry. Here, the contactless payment application corresponding to the card application gate refers to one or some contactless payment applications installed in the smart card; and the communication standard adopted by the corresponding contactless payment system is identical to the communication standard corresponding to the card application gate. When the smart card queries the registry, it determines whether the installed contactless payment application has a communication standard corresponding to the contactless payment application which is identical to the communication standard corresponding to the card application gate.

If the smart card has the contactless payment application corresponding to the card application gate, then the smart card creates a pipe between the card application gate and the corresponding card RF gate in the NFC contactless front-end chip, and the NFC contactless front-end chip enables relevant functions of the communication standard corresponding to the created pipe; if the smart card has no contactless payment application corresponding to the card application gate, then the smart card does not create a pipe between the card application gate and the corresponding card RF gate in the NFC contactless front-end chip, and the NFC contactless front-end chip will not enable relevant functions of the communication standard corresponding to the card application gate.

In the eNFC solution, the smart card stores the contactless payment application and provides a secure and open application running environment. The smart card may be an SIM card, a UIM card, a USIM card or other smart cards according to use conditions.

In one embodiment of the invention described below, the USIM card is taken as an example; when the smart card is an SIM card, a UIM card or other smart cards, the method is also applicable.

The USIM card may adopt a Java card technology and conform to a global platform card specification V2.2; the USIM card has a Java Card Runtime Environment (JCRE). The JCRE comprises a Java Card Virtual Machine (JCVM), a Java card framework and API, and an extension interface specified by card providers.

A contactless electronic payment application program Applet based on a javacard.framework.Applet class base can implement install, register, select, deselect and process methods defined in a runtime environment specification for the Java Card™ platform version 2.2.2, and implement the process of a payment service according to the corresponding contactless payment application specification. Each application has a unique AID that consists of a registered application RID and PIX; the encoding rule of the AID may refer to the requirements of ISO/IEC 7816-5: identification cards—integrated circuit cards—Part 5: registration of application providers: 2004.

When the contactless payment application program is issued, it is necessary to first compile a source code file into a binary class file (.class file) by using a Java compiler, and then convert the class file by a converter and a checker, wherein the converted file is an install file that can be installed to the SIM card, i.e., a CAP file.

The converter is a byte code tool provided by a Java card development kit. As the byte code tool, it needs the help of a Java interpreter to run. It converts the class file into some output files. During the conversion, an input file is the class file generated by the compiler; and an output file comprises a CAP file, an export file, and a JCA file, with extensions of *.cap, *.exp, *.jca respectively, wherein the names of the output file are consistent with the input file. They will be placed in a subdirectory javacard under a Java card project directory.

The format of a converter command line is: <interpreter><-classpath><executed class><optional parameter><package name><package AID><version>.

Wherein the interpreter is used for providing a path and file name of the interpreter, for example, c:\JDK\bin\java.exe; and the executed classes are those under the directory of com\sun\javacard\converter\converter\ in converter.jar.

After installing the Java card development kit, the development kit will provide a batch file converter.bat which comprises <interpreter><-classpath><executed class> in the command line. That is to say, during converting the Applet, it is not required to sufficiently understand these three parts of parameters, and the file conversion may be performed directly by using converter.bat.

The optional parameters are some optional parameters in the command line, and they comprise:
classdir: a root directory of a project;
exportpath: some parent directories of Exp files used for the conversion;
d: an output path that indicates a root directory;
applet[AID][classname]: it indicates an AID of default Applet and a class file name including install( )method;

out[CAP][EXP][JCA]: it indicates what files to be generated by a converter, normally, CAP and EXP files by default; and nobanner: information using standard output.

A package name refers to the package to be converted; package AID is an AID of the appointed Applet; and the version is a version number defining the Applet.

For example, one example of the command line of the converter may be:

```
c:\JDK\bin\java.exe           -classpath              c:\jc211\bin\converter.jar
com.sun.javacard.converter.Converter  -out EXP JCA CAP  -exportpath c:\jc211\api21
-applet                        0xa0:0x0:0x0:0x0:0x0:0x62:0x3:0x1:0xc:0x1:0x1
com.sun.javacard.samples.HelloWorld.HelloWorld
com.sun.javacard.samples.HelloWorld 0xa0:0x0:0x0:0x0:0x0:0x62:0x3:0x1:0xc:0x1 V1.0.
```

The USIM card supports multiple applications, so multiple applications can be installed on the card. Payment applications may be pre-installed to the USIM card and downloaded from a remote server through a mobile communication network to be installed to the USIM card after the USIM card is issued. After the CAP file of the contactless payment application is downloaded to the USIM card, the USIM card can acquire the AID, version number and other information about the contactless payment application; the relevant information about the contactless payment application will be registered to the registry of the USIM card when the application is installed on the USIM card; and the registered information may comprise the name, AID, status and the like of the application.

To enable the contactless payment application to identify the communication standard adopted by the corresponding contactless payment system, when the class file of the contactless payment application program is converted by a converter into the install file that can be installed to the smart card, the identification information about the communication standard that is supported by the contactless payment application is added into the version parameter of the conversion command; and the communication standard adopted by the corresponding contactless payment system is identified by the identification information in the version number of the contactless payment application program.

Generally, the format of the version number may be: AP_'an identifier of the communication standard'_'version number'; the identifier of the communication standard can be represented by letters. For example, A represents ISO14443 Type A standard; B represents ISO14443 Type B standard; C represents Felica standard; M represents Mifare standard, and F represents ISO18092 standard. For example, if the version number is 'AP_B_1.0', it indicates that the communication standard adopted by the contactless payment system corresponding to the contactless payment application is ISO14443 Type B standard with the version of 1.0. Of course, other version number encoding formats may be adopted as required.

After the contactless payment application program is converted into the CAP file that can be installed to the USIM card, the CAP file can be downloaded from a remote server to a smart card through a mobile communication network. In order to implement remote download of the payment application program, the mobile terminal needs to support data services and support the manner of data service to realize On the Air (OTA); in order to download data to the USIM card in a high speed, a Bearer Independent Protocol (BIP) may be employed for communication between the mobile terminal and the USIM card.

The BIP protocol is a connection-oriented transfer protocol proposed in the 3$^{rd}$ Generation Partnership Project (3GPP). it supports high-speed channels: a General Packet Radio Service (GPRS), an Enhanced Data Rate For GSM Evolution (EDGE) technology, UMTS and the like; it supports five active commands: 'OPEN CHANNEL', 'CLOSE CHANNEL', 'RECEIVE DATA', 'SEND DATA' and 'GET CHANNEL STATUS', and it also supports two events: Data available and channel status, so that the USIM card can create a connection-oriented data channel with a remote OTA server through the bearing capacity of the mobile terminal.

The smart card can indicate the mobile terminal to connect to the remote OTA server over a mobile data service channel through the OPEN CHANNEL command of the BIP and browse downloadable contactless payment applications on the OTA server through the Card Application Toolkit (CAT); after the mobile terminal determines to download the application, it will initiate an application download request message to the remote OTA server. The OTA server will select a secure domain on the USIM card after receiving the application download request, wherein the secure domain is used for storing the downloaded contactless payment applications; after selecting the secure domain on the USIM card, the OTA server and the secure domain in the USIM card create a secure channel according to the specification on the secure channel in global platform card specification V2.2; after the secure channel is created successfully, the remote OTA server sends an INSTALL (for load) command to the USIM card; and the download of the contactless payment application starts between the smart card and the OTA server.

After the payment application is completely downloaded, the remote OTA server may send an INSTALL [for install] command to the USIM card to indicate the USIM card to install the downloaded payment application.

In this embodiment, during installing the contactless payment application, when the contactless payment application is registered, the USIM card may add the information about the communication standard adopted by the contactless payment system corresponding to the contactless payment application into the registry of the USIM card and record the communication standard corresponding to the contactless payment application through the registry. In order to implement recording the communication standard corresponding to the contactless payment application in the registry of the USIM card, the registry of the USIM card can set identification information in the information that records the installed contactless payment applications, wherein the identification information is used for recording the communication standard corresponding to the contactless payment application. The identification information about the communication standard may adopt the encoding rule of the communication standard identifier in the contactless payment application. For example, A represents ISO14443 Type A standard; B represents ISO14443 Type B standard; C represents Felica standard; M represents Mifare standard, and F represents ISO18092 standard.

Specifically, when installing the contactless payment application, the USIM card will call the install method of the contactless payment application program. The install method comprises: creating an instance of the contactless payment application and the needed object, performing an initialization operation, and granting initial values to data; finally calling a register method of the contactless payment application to register the contactless payment application to the registry in the USIM card; during performing the register method, the information about the contactless payment application is added into the registry of the USIM card, wherein the information may comprise the name of the contactless payment application, AID, and identification information about the communication standard corresponding to the contactless payment application. After the register method is successfully run, the contactless payment application is successfully installed, and the USIM card may report the successful installation in the INSTALL [for install] response message sent to the remote OTA server.

Hereinafter, the processing process of creating a pipe after the USIM card is powered on in this embodiment will be described with reference to FIG. 1, it comprises the following steps.

Step S101: After the NFC contactless front-end chip powers the smart card, communication between a physical layer and a data layer is created between the USIM card and the NFC contactless front-end chip through a single wire protocol.

Step S102: The USIM card acquires a list of the card RF gates that are supported by the NFC contactless front-end chip.

Here, the USIM card and NFC contactless front-end chip communicate between in the logic layer according to the requirement of a host control interface. Specifically: an administration gate in the USIM card sends a getting parameter command ANY-GET-PARAMETERS (GATES-LIST) to the administration gate in the NFC contactless front-end chip through PIPE1; and the administration gate in the NFC contactless front-end chip returns a list of the gates that are supported by the NFC contactless front-end chip, wherein the list comprises the card RF gates supported by the NFC contactless front-end chip.

Step S103: Before creating a pipe between each card application gate in the USIM card and the corresponding card RF gate in the NFC contactless front-end chip, the USIM card will determine whether the card application gate in itself has a corresponding contactless payment application; if the USIM card has a contactless payment application corresponding to the card application gate, step S104 is executed; otherwise, step S105 is executed.

Here, the contactless payment application corresponding to the card application gate refers to one or some contactless payment applications installed in the smart card; the communication standard adopted by the corresponding contactless payment system is the same as the communication standard corresponding to the card application gate. For example, the contactless payment application corresponding to the card application gate adopting ISO 14443 Type A also adopts ISO14443 Type A standard.

In this embodiment, the judging method is that: the USIM card retrieves the identification information about the corresponding communication standard that is registered in the registry during installing the contactless payment application and judges whether a contactless payment application corresponding to the card application gate exists based on the identification information.

Step S104: The USIM card creates a pipe between the card application gate and the corresponding card RF gate in the NFC contactless front-end chip, and the NFC contactless front-end chip enables relevant functions of the corresponding communication standard.

Specifically, the USIM card may appoint, in the ADM_CREATE_PIPE, the ID number of a card RF gate in the NFC chip to be connected and send the command to an administration gate in the NFC contactless front-end chip through PIPE 1; the administration gate in the NFC contactless front-end chip appoints the ID number of the pipe to be created after receiving the command and returns ANY_OK; thereby creating a pipe between the card application gate in the USIM card and the corresponding card RF gate in the NFC chip; after the pipe is created, the NFC contactless front-end chip enables relevant functions of the corresponding communication standard, so that the mobile terminal can communicate with a corresponding contactless card reader to perform related contactless payment.

Step S105: The USIM card does not create a pipe between the card application gate and the corresponding card RF gate in the NFC contactless front-end chip, and the NFC contactless front-end chip does not enable relevant functions of the corresponding communication standard.

The processing process of creating a pipe for a card application gate in the USIM card by a USIM card has been described above; if the USIM card has multiple card application gates, the USIM card can adopt the same method to create a corresponding pipe for each card application gate in sequence.

What is claimed is:

1. A communication method, for communication between a smart card and an NFC contactless front-end chip, comprising: when installing a contactless payment application, the smart card recording a communication standard adopted by a contactless payment system corresponding to the contactless payment application, wherein the communication standard is identified by identification information provided by the contactless payment application; further comprising:

for each card application gate, the smart card judging whether a contactless payment application corresponding to the card application gate exists based on the identification information; if yes, creating a pipe between the card application gate and a corresponding card RF gate in the NFC contactless front-end chip, and then performing, by the smart card, contactless payment related to the contactless payment system;

wherein the step that the contactless payment application provides the identification information comprises: a contactless payment application program provides the identification information about the communication standard adopted by the corresponding contactless payment system in a version number; and wherein the program version number of the contactless payment application has a format of: AP 'an identifier of communication standard' 'version number'; and the identifier of the communication standard is represented by letters.

2. The method according to claim 1, further comprising: if no contactless payment application corresponding to the card application gate exists, no pipe being created between the card application gate and the corresponding card RF gate in the NFC contactless front-end chip.

3. The method according to claim 1, wherein the step of recording a communication standard adopted by a contactless payment system corresponding to the contactless payment application comprises: recording information about the payment application in a registry of the smart card; and the information about the payment application comprises identification information about the communication standard adopted by the contactless payment system corresponding to the contactless payment application.

4. The method according to claim 1, wherein the communication standard adopted by the contactless payment system is a communication standard corresponding to a communication technology adopted by communications between a contactless card in the contactless payment system or a terminal equipment serving as a contactless card and a card reader in the contactless payment system.

5. The method according to claim 1, wherein the step of judging comprises: the smart card queries in information about installed contactless payment application recorded in the smart card through the identification information, and judges whether a contactless payment application corresponding to the card application gate exists.

6. The method according to claim 1, wherein the contactless payment application corresponding to the card application gate comprises one or more contactless payment applications installed in the smart card; and the communication standard adopted by the contactless payment system corresponding to the contactless payment application is identical to the communication standard corresponding to the card application gate.

7. A smart card, comprising a recording unit, a judging unit and a pipe creating unit, wherein
the recording unit is used for recording a communication standard adopted by a contactless payment system corresponding to a contactless payment application during installing the contactless payment application, and the communication standard is identified by identification information provided by the contactless payment application;
the judging unit is used for determining, for each card application gate in the smart card, whether a contactless payment application corresponding to the card application gate exists through the identification information, and notifying the pipe creating unit if it exists; and
the pipe creating unit is used for creating a pipe between the card application gate and a corresponding card RF gate in an NFC contactless front-end chip based on notification from the judging unit, and used for performing contactless payment related to the contactless payment system;
wherein the identification information is contained in a version number of the contactless payment application; and wherein the program version number of the contactless payment application has a format of: AP 'an identifier of communication standard' 'version number'; and the identifier of the communication standard is represented by letters.

8. The smart card according to claim 7, wherein the contactless payment application corresponding to the card application gate comprises one or more contactless payment applications installed in the smart card; and the communication standard adopted by the contactless payment system corresponding to the contactless payment application is identical to the communication standard corresponding to the card application gate.

9. An eNFC terminal supporting a contactless payment application, comprising an NFC contactless front-end chip with more than one card RF gate and a smart card with more than one card application gate, wherein the smart card comprises:
a recording unit, for recording a communication standard adopted by a contactless payment system corresponding to a contactless payment application during installing the contactless payment application, and the communication standard is identified by identification information provided in advance by the contactless payment application;
a judging unit, for determining, for each card application gate in the smart card, whether a contactless payment application corresponding to the card application gate exists through querying the identification information, and notifying a pipe creating unit if it exists; and
a pipe creating unit, for creating a pipe between the card application gate and the corresponding card RF gate in the NFC contactless front-end chip based on notification from the judging unit, and for performing contactless payment related to the contactless payment system;
wherein the step that the contactless payment application provides the identification information comprises: a contactless payment application program provides the identification information about the communication standard adopted by the corresponding contactless payment system in a version number; and wherein the program version number of the contactless payment application has a format of: AP 'an identifier of communication standard' 'version number'; and the identifier of the communication standard is represented by letters.

10. The terminal according to claim 9, wherein the step of recording a communication standard adopted by a contactless payment system corresponding to the contactless payment application comprises: recording information about the payment application in a registry of the smart card; and the information about the payment application comprises identification information about the communication standard adopted by the contactless payment system corresponding to the contactless payment application.

11. The terminal according to claim 9, wherein the contactless payment application corresponding to the card application gate comprises one or more contactless payment applications installed in the smart card; and the communication standard adopted by the contactless payment system corresponding to the contactless payment application is identical to the communication standard corresponding to the card application gate.

* * * * *